Figure 1:
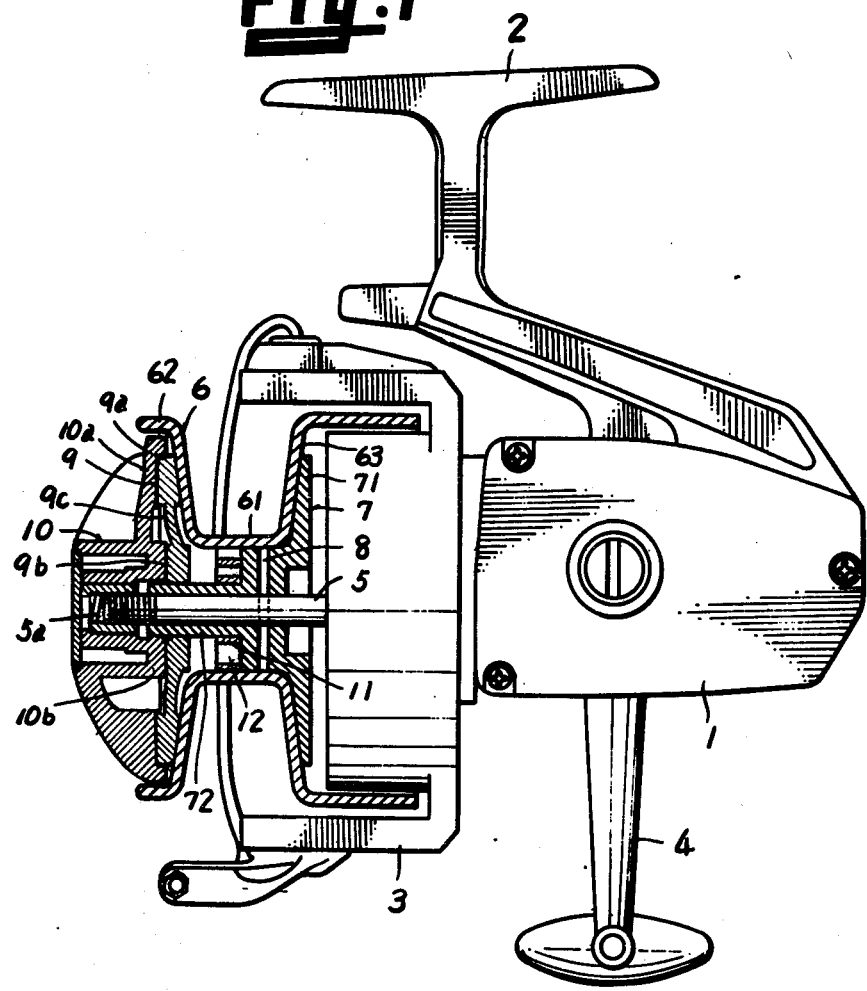

United States Patent [19]

Kamikawa

[11] 4,153,219
[45] May 8, 1979

[54] FISHING REEL

[75] Inventor: Kiyohide Kamikawa, Sakai, Japan

[73] Assignee: Shimano Industrial Company Limited, Osaka, Japan

[21] Appl. No.: 876,663

[22] Filed: Feb. 10, 1978

[30] Foreign Application Priority Data

Feb. 18, 1977 [JP] Japan .............................. 52-19677[U]

[51] Int. Cl.² ........................................................ A01K 89/00
[52] U.S. Cl. ............................... 242/84.51 R; 242/220
[58] Field of Search ................. 242/84.51 R, 84.51 A, 242/84.5 R, 215, 220, 221

[56] References Cited

U.S. PATENT DOCUMENTS

| | | | |
|---|---|---|---|
| 2,615,649 | 10/1952 | Flewelling | 242/84.51 R |
| 3,136,497 | 6/1964 | Wood, Jr. | 242/84.51 R |
| 3,254,861 | 6/1966 | Jahn | 242/84.51 A |
| 3,510,083 | 5/1970 | Cook | 242/84.51 R |
| 3,806,060 | 4/1974 | Valentine | 242/84.51 R |

Primary Examiner—Leonard D. Christian
Attorney, Agent, or Firm—Stevens, Davis, Miller & Mosher

[57] ABSTRACT

A fishing reel has a spool shaft rotatably supporting a spool on the shaft being provided with a control for restraining the spool from axially moving and a drag plate applying resistance against the rotation of spool. The drag plate is disc-like shaped and has an outer peripheral portion capable of being in contact with a front disc-like wall of the spool, a central portion non-rotatably supported to the spool shaft and axially movable with respect thereto, and an intermediate portion connecting the central and outer peripheral portions which is elastically deformable axially of the spool shaft, so that the spool may be adjusted widely with respect to rotational resistance applied thereto and locked to the spool shaft under the maximum rotation resistance.

8 Claims, 4 Drawing Figures

FISHING REEL

This invention relates to a fishing reel and more particularly to a fishing reel having a reel body, a spool shaft supported thereto, a spool rotatably supported to the spool shaft, and a drag mechanism for applying a desirable resistance to the rotation of spool.

Generally, the drag mechanism, which is mounted to the fishing reel for applying a desirable resistance to the rotation of spool, comprises; a drag plate having a plurality of washers rotatable integrally with the spool, one or more washers mounted non-rotatably to the spool shaft, and a plurality of cushions inserted between each washer so as to be rotatable with respect to the spool and, spool shaft; and, an adjustment knob screwed to one axial end of the spool shaft. The drag plate, housed within a recess formed inside the trunk of the spool, is urged against the bottom of the recess by turning the knob, thereby applying the desirable resistance to the spool.

Several problems exist with this arrangement. First, the conventional drag mechanism is restricted to adjustments by the knob in the rotational resistance applied to the spool such that even a slight turn of the knob causes great change of the resistance, thereby making minute adjustment impossible, secondly, the maximum rotational resistance for clamping the spool is so restricted that the resistance cannot be increased to the extent of locking the spool to the spool shaft.

For increasing the maximum force for clamping the spool, the washers, cushions or the bottom of recess, are made rough or are provided with a lining to increase the coefficient of friction, but the adjustment range as aforegoing becomes further smaller, which is impracticable.

On the other hand, several methods have been suggested for enlarging the adjusting range, such increasing the amount at deformation or the number of the cushions in use, or providing springs in place of the cushions. These methods which not only complicate the construction of a fishing reel, but also reduce the maximum clamping force, thereby making it more difficult to lock the spool to the spool shaft.

The invention has been designed to solve the above noted problems. Accordingly, one object of the invention is to provide a fishing reel which is very simple in construction, has a much larger maximum force for clamping the spool, and has a drag which is minutely adjustable by the drag mechanism, the latter being set to have a larger adjusting range while enabling the rotation of the spool to be substantially locked.

The invention is characterized in that at the spool shaft rotatably supporting the spool a control for restraining the spool, from axial moving and a drag plate for applying resistance against the rotation of spool are provided. The drag plate is disc-like shaped to have an outer peripheral portion capable of being in contact with the front wall of the spool, a central portion supported to the spool shaft in relation of being non-rotatable but axially movable with respect thereto, and an intermediate portion connecting the central and outer peripheral portion which is and elastically deformable axially of the spool shaft. The invention is further characterized in that an adjustment knob screwed to one axial end of the spool is provided at its outer periphery with an outer presser with which the outer peripheral portion of the drag plate is urged against and at the center with an inner presser with which the central portion of the drag plate is urged against. The desirable rotational resistance may be applied to the spool when the adjustment knob is turned to urge the drag plate toward the control through the inner presser of the adjustment knob. When the adjustment knob is turned in this manner, at first the intermediate portion of the drag plate is elastically deformed to allow the outer peripheral portion thereof to be in contact with the front wall of the spool to thereby apply thereto a desired resistance corresponding to the deformation, and then the outer presser of the adjustment knob is, after the elastical deformation of the drag plate has occurred brought into contact directly with the outer peripheral portion of the drag plate so as to urge that portion against the front wall of the spool, thereby applying thereto a resistance corresponding to the urging force.

Accordingly, the fishing reel of the invention can apply to the spool a desired rotational resistance in approximately two steps, and be dragged in a desired manner by adjusting the rotational resistance to the spool over a wide range, in other words, the amount of applied resistance increases more slowly than hereto possible in accordance with a screw stroke of the adjustment knob. Furthermore, the outer presser of the adjustment knob ultimately urges the outer peripheral portion of the drag plate directly against the front wall of the spool to thereby increase the maximum resistance to the extent of locking the spool to the spool shaft.

Figure 2:
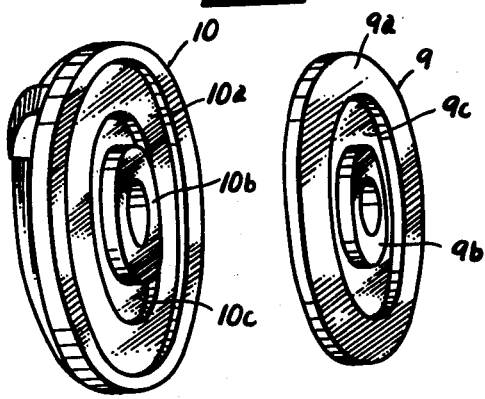
Figure 3:
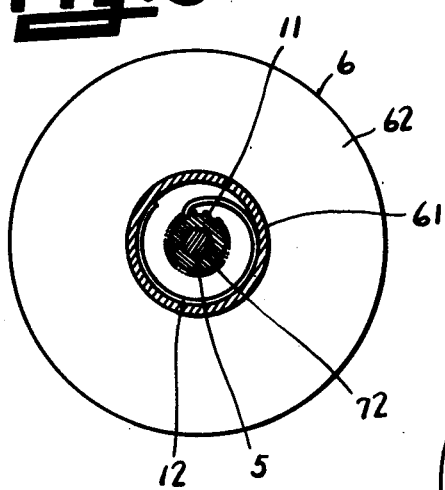
Figure 4:
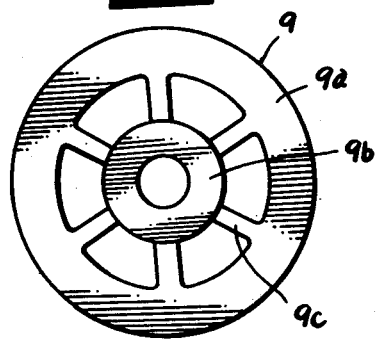

These and other objects and advantages of the invention will become more apparent upon a reading of the following detailed specification and drawings, in which:

FIG. 1 is a partially longitudinally sectional side view of an embodiment of the invention, FIG. 2 is a perspective view showing an adjustment knob and a drag plate, FIG. 3 is a sectional view taken on Line III—III in FIG. 1, and FIG. 4 is a front view of a modified embodiment of the invention.

A spinning reel is shown in FIG. 1, in which the reference numeral 1 designates a reel body with a mounting leg 2 for mounting the reel to a fishing rod. The reel body 1 is box-like shaped, to which a handle shaft (not shown), as wellknown, driven by a crank handle 4 is widthwise supported. A spool shaft 5 projecting forwardly of the reel body 1 is lengthwise supported such that it is non-rotatable and only lengthwise movable in reciprocation with respect to the reel body. A tubular shaft (not shown) carrying a rotary frame 3 is rotatably supported. Housed within the reel body 1 are, as is wellknown, a master gear fixed to the handle shaft, a pinion in cooperative rotation with the master gear, and a device for reciprocating the spool shaft 5, which are not shown.

The spool shaft 5 passes through the center of the tubular shaft so as to be supported thereto at the intermediate portion of the same and projects at the tip forwardly from the rotary frame 3, the tip supporting a spool 6 rotatably and providing a screw thread 5a for screwing therewith an adjust knob 10 to be hereinafter described.

The crank handle 4 is operated to drive the handle shaft, master gear, pinion, and tubular shaft so as to allow the rotary frame 3 to rotate, thus winding up a fishing line (not shown) onto the spool 6 through a bail arm, the line wind-up function and construction are well-known and need not be described in detail.

The spool 6 comprises a trunk 61 of a larger diameter cylinder than the spool shaft 5 and disc-like shaped front and rear walls 62 and 63 extending outwardly radially from both axial ends of the trunk 61 respectively. The spool is restricted from being moved toward one axial end, i.e., a side of the reel body 1, by means of a control member 7 fixed to the spool shaft 5.

The control member 7 has a flange 71 larger in diameter than the trunk 61 and is axially extended to form a tubular guide 72, which is fixed to the spool shaft 5 through a pin 8 perforating radially therethrough, the flange 71 being brought into contact with the outer surface of the rear wall 63 of the spool 6 so as to restrict the spool from axially moving. The tubular guide 72 has the foremost end axially cut in flat for a given length and is formed in a non-cirlulular section. Onto the foremost end is insertably supported a non-rotatable drag plate 9 which is only axially movable, the drag plate serving to apply rotational resistance to the spool 6.

The drag plate 9 is, as shown in FIG. 2, formed in a disc-like shape of soft synthetic resin so as to provide an outer peripheral portion 9a, a central portion 9b and an intermediate portion 9c therebetween. The outer peripheral portion 9a is in contact with the front wall 62 of the spool 6, and the central portion 9b has a boss having a non-circular bore. The drag plate 9 is inserted onto the foremost end of the guide 72 through the bore so that it is supported to the spool shaft 5 through the guide 72. The intermediate portion 9c is made thin so as to be elastically deformable. The portion 9c may, rather than being thin, be deformable due to the presence of a plurality of strips as shown in FIG. 4, the strips having a plurality of bores or being made from resiliently deformable material so as to connect therewith the outer peripheral portion 9a and central portion 9b.

The screw thread 5a provided at the tip of the spool shaft 5 is screwed with an adjustment knob 10 for operably urging the drag plate 9 toward the control member. The knob 10 has a round portion slightly larger in diameter than the drag plate 9 as shown in FIG. 2, the round portion having a radially outer presser 10a in contact with the outer peripheral portion 9a of the drag plate 9 the latter of which is to be urged against the front wall 62 of the spool 6, and a radially inner presser 10b in contact with the central portion 9b, the latter of which is to be urged toward the front wall 62 of the spool. The inner presser 10b, which is located closer to the control member than the outer presser 10a, is adapted to move in advance of the outer presser 10a when the knob 10 is operated to move the drag plate 9, so that the central portion 9b of the drag plate 9 may first be moved toward the front wall 62.

The central portion 9b advancement mechanism is configured to move the central portion 9b in advance of the outer peripheral portion 9a toward the front wall 62 so that the intermediate portion 9c is deformed to bring the outer peripheral portion 9a into contact with the front wall 62; however it is not limited to the first described construction. The outer and inner pressers 10a and 10b may be levelled; that is provided in the same plane and the central portion 9b of the drag plate may be formed to protrude more than the outer peripheral portion 9a toward the adjustment knob.

In addition although, the drag plate 9 is disclosed as being supported to the guide 72 of the control member 7, it may alternatively be supported directly to the spool shaft 5. The spool 6, which is rotatably supported to the control 7 member similarly to the drag plate, may have trunk 61 of a larger inner diameter than an outer diameter of the spool shaft and may be directly supported thereto.

In the drawings, the reference numeral 11 designates a gear formed at the outer periphery of the guide 72 of the control member 7; 12 is a spiral spring in mesh with the gear 11. The spiral spring 12 is inserted between the inner periphery of the spool 6 and the outer periphery of the guide 72 and retained at one end to the spool 6 so that the spring clutters when in mesh with the rotating gear.

The gear 11 may be formed, for example, at the end face of the boss of the central portion 9b of the drag plate 9, opposite to the knob 10.

The fishing reel of the invention constituted as aforegoing is operated in such a manner that when the adjustment knob 10 is turned to be screwed forward with respect to the spool shaft 5, the inner presser 10b is firstly abutted against the central portion 9b of the drag plate 9 to urge the drag plate 9 to move toward the front wall 62, then the intermediate portion 9c is elastically deformed while the outer peripheral portion 9a of the drag plate 9 is in contact with the front wall 62, so that the outer peripheral portion 9a is pressed against the front wall 62 by means of the elastic force caused by the deformation. In other words, the elastic force caused by the deformation of 9c applies to the spool the desirable rotational resistance corresponding to the extent of deformation. Since the resistance or the clamping force, is relatively small, the fishing line can be drawn out of the spool even when a hooked fish pulls with a comparatively light force.

When further turned, the knob 10 is abutted at its outer presser 10a directly against the outer peripheral portion 9a, thereby applying to the spool 6 greater rotational resistance corresponding to the urging force by the presser. Namely, the outer peripheral portion 9a is larger in radial width so as to contact with the front wall 62 directly and in a larger area to result in increasing the rotational resistance, i.e., the force clamping the spool, to the maximum substantially corresponding to locking the rotation of the spool 6.

As clearly understood from the aforegoing description, the fishing reel of the invention is very simple in construction and inexpensive in practical use, while the drag mechanism enables the spool-clamping force, i.e., the rotational resistance, to be considerably increased substantially to the extent of locking the rotation of the spool. The adjustment range is also enlarged thereby allowing for an extremely minute drag adjustment.

It is further understood by those skilled in the art that the aforegoing description is of preferred embodiments of the disclosed device and that various changes and modification may be made in the invention without departing from the spirit and scope thereof.

What is claimed is:
1. A fishing reel comprising;
   a reel body;
   a spool shaft supported to said reel body and having a screw thread at the foremost end;
   a spool rotatably supported to said spool shaft, said spool having a trunk and front and rear walls extending radially outwardly from respective axial ends of said trunk, said spool shaft having a control member mounted non-rotatably thereto, said control member restricting said spool from being moved in one axial direction;

a single drag plate for applying resistance against the rotation of said spool with respect to said spool shaft, said drag plate being disc-like shaped, and comprising an outer peripheral portion adapted to be in contact with the outer surface of said front wall, a central portion being supported to said spool shaft in relation of being non-rotatable and slidable with respect thereto, and an intermediate portion between said central portion and outer peripheral portion which is elastically deformable axially of said spool shaft;

an adjustment knob screwed onto said screw thread of said spool shaft, said knob having a radially extending outer presser and a radially extending inner presser, said outer presser being moveable by the turning of said adjustment knob to contact with and urge said outer peripheral portion of said drag plate toward said spool front wall, said inner presser being moveable by the turning of said adjustment knob to contact with and urge said central portion of said drag plate toward said spool to thereby urge said outer peripheral portion toward said spool.

2. The fishing reel according to claim 1, wherein when said knob is turned in the direction of urging said drag plate toward said spool the central portion of said drag plate is moved ahead of said outer peripheral portion toward the outer surface of said front wall of the spool, so that said intermediate portion of the drag plate may be deformed to bring said outer peripheral portion into contact with said outer surface of the front wall.

3. The fishing reel according to claim 2, wherein said inner presser of the adjustment knob is located closer to said control member than said outer presser and when said knob is turned in the direction of urging said drag plate toward said spool said inner presser is adapted to move ahead of said outer presser so that the central portion of said drag plate may be moved toward the outer surface of said front wall.

4. The fishing reel according to claim 2, wherein the central portion of said drag plate projects toward said knob with respect to said outer peripheral portion and said inner and outer pressers reside in the same plane such that said central portion is moved ahead of said outer portion when said knob is turned in the direction of urging said drag plate toward said spool.

5. The fishing reel according to claim 1, wherein said intermediate portion between said central and outer peripheral portions of said drag plate is thinner than said central and outer portions so as to be elastically deformable in the axial direction of said spool shaft.

6. The fishing reel according to claim 1, wherein said intermediate portion between said central portion and outer peripheral portion of said drag plate is formed of a plurality of legs of strips, said strips extending radially of said drag plate and being elastically deformable.

7. The fishing reel according to claim 1, wherein said control member is made larger in diameter than said trunk of the spool so as to be in contact with the outer surface of said rear wall of the spool to thereby restrict said spool from being moved in one axial direction.

8. The fishing reel according to claim 1, wherein a tubular guide extending outwardly axially of said spool shaft is formed at the central portion of said control member and said drag plate is supported at the outer periphery of the foremost end of said guide in relation of being non-rotatable and axially movable.

* * * * *